May 5, 1931.  W. G. E. ROLAFF  1,803,677
VALVE CONTROLLING MECHANISM FOR REFRIGERATING SYSTEMS
Filed Aug. 13, 1926
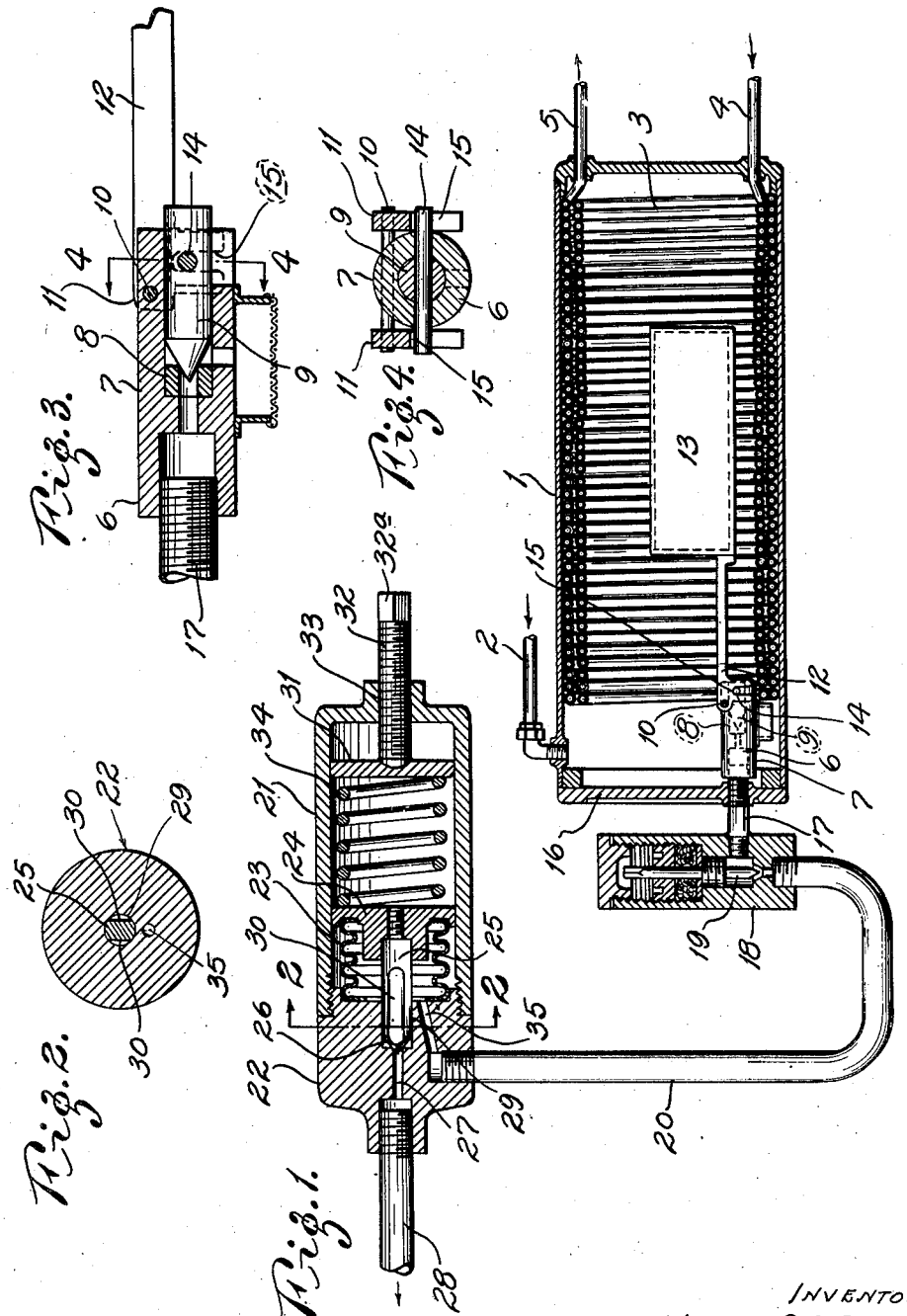
INVENTOR:
WALTER G.E. ROLAFF
By Elliott Harrington
ATTORNEY

UNITED STATES PATENT OFFICE

WALTER G. E. ROLAFF, OF ST. LOUIS, MISSOURI

VALVE CONTROLLING MECHANISM FOR REFRIGERATING SYSTEMS

Application filed August 13, 1926. Serial No. 129,038.

This invention relates to the art of mechanical refrigeration, and has for its general object to provide novel means for facilitating and rendering certain and reliable the distribution of the refrigerant to the expansion coils or low side of a refrigerating system. Stated more specifically, it is an object of the invention to provide a novel valve control interposed between the distributor and the expansion coils, the operation of which is controlled by a predetermined mechanical pressure on one side and by the pressure of the liquid refrigerant from the distributor on the other side, the feed of such refrigerant, in turn, being controlled by a float valve located in the distributing chamber whereby the pressure of the liquid refrigerant in the system between my control valve and the float valve will operate to substantially balance the latter, so that it may readily open and close under the operation of the float, according to varying heights of the liquid refrigerant in the distributing chamber. In refrigerating systems, it is common to control the flow of the refrigerant from a distributing chamber to the expansion coils by a float valve, and the operation of such float valve is wholly controlled by the rising or falling of the float, according to the height of the refrigerant in the distributing chamber. In such an arrangement, the liquid refrigerant passes directly through the float valve to the expansion coils, where its pressure is greatly reduced, and hence it follows that the pressure in the distributing chamber containing the float valve is always largely in excess of the pressure in the system beyond the float valve, so that for the float to rise as the height of liquid increases in the distributing chamber, the valve operated thereby has also to overcome the resistance of the pressure in the chamber. As is well known, these valves frequently stick, due to freezing, as the refrigerant begins to evaporate as soon as it passes the valve, and hence it frequently occurs that the excess pressure within the distributing chamber will be great enough to, at times, withstand the power of the float due to buoyancy to open the valve, and, more frequently, such action will be greatly retarded so as to render the operation of the system uncertain and to prevent maintaining a uniform refrigerating temperature in the place or compartment to be refrigerated. According to my invention, the interposition of a control valve which is maintained closed by a definite mechanical pressure and which can only be opened by a pressure of the refrigerant operating on the other side of the valve greater than that of the mechanical pressure exerted to close it, always insures that a back pressure will be exerted upon the float valve sufficiently great to substantially balance it, and this pressure can never fall below the degree necessary for such balancing effect, for as soon as the pressure between the float valve and my control valve falls below the given degree, the mechanical pressure will be exerted on the control valve to close it and thus prevent further flow of the refrigerant to the expansion coils and, therefore, further decrease of such pressure.

The invention is illustrated in the accompanying drawing, in which—

Figure 1 is a longitudinal sectional view illustrating a distributing chamber with my improved control valve connected to the outlet pipe leading from said chamber and controlled by a float valve in the distributing chamber;

Figure 2 is a cross-sectional view through the control valve on the line 2—2 of Figure 1;

Figure 3 is an enlarged sectional view of the float valve proper; and

Figure 4 is a section on the line 4—4 of Figure 3.

Referring now to the drawing, the numeral 1 indicates a distributing chamber which is adapted to be supplied with compressed refrigerant by means of a pipe 2 entering the top thereof near one end. To economize space in my commercial refrigerating system, I preferably locate a condensing coil 3 in the chamber 1, which is connected to an inlet pipe 4 and an outlet pipe 5 entering and passing out of the same end of the chamber, respectively. Located at the opposite end of the chamber 1 is a float valve 6, which is shown enlarged in Figure 3. This valve comprises a casing 7 having mounted therein a valve seat 8 adapted to receive the pointed end of a needle valve 9. Mounted in the upper end of the casing 7 and projecting from opposite sides thereof is a pin 10 on opposite ends of which are pivotally mounted yoke members 11 of a bar 12, on the outer end of which is mounted a float 13. Extending through the body of the needle valve 9 is a pin 14 which is clear of the casing 7, the opposite ends of which pin are mounted in slots 15 formed on the lower sides of the yoke members 11. As compressed refrigerant enters the chamber 1 through pipe 2 the float 13 will rise and the slots 15 engaging the pins 14 will move the needle valve away from its seat and permit the liquid refrigerant to flow out of the chamber through the casing 7. Mounted in the end of the wall 16 of the chamber 1 near the lower end thereof is a pipe 17, the inner end of which, as shown by Figure 3, is screwed into one end of the casing 7 of the float valve, and the other end of which is screwed into a casing 18 which is provided with a manually-operated valve 19 for adjusting the quantitative flow of the liquid refrigerant to an outlet pipe 20, or for cutting off said flow entirely if occasion should require, as in shutting down the system. The outlet pipe 20 leads to my improved control valve, which comprises a casing 21, in one end of which is screwed a plug 22. Mounted in the casing 21 is a bellows 23 which bears at one end against the inner end of the plug 22, and at its other end is closed by a piston plunger 24 which fits in the bore of the casing 21, but is readily movable therein. Secured at one end in the plunger 24 is a needle valve 25, the pointed head 26 of which controls an outlet passage 27 formed in the plug 22 and communicating with a feed pipe 28 screwed at one end into the plug 22 and leading to the expansion coils, or low side of the system. The body of the needle valve 25 works in and is guided by a recess 29 formed on the inner side of the plug 22 and said body is flattened on opposite sides, as indicated at 30 in Figures 1 and 2, to permit the liquid refrigerant to pass by said valve to the port or passage 27.

Mounted in the casing 21 is a plate 31 which also snugly and movably engages the walls of the bore of the casing and has secured on its outer side, the end of a set screw 32 provided with a non-circular outer end 32a, so that it may be turned by a wrench or other suitable instrument. The set screw 32 has screwthreaded engagement with an opening in the end of the casing 21, as indicated at 33. Interposed between the plate 31 and the plunger 24 is a coil spring 34 which operates normally to hold the valve 25 to its seat. This pressure may be regulated by turning the set screw 32 in one direction or the other, as will be readily understood. The port 35 in the plug 22 connects the end of the outlet pipe with the interior of the bellows 23.

In operation, compressed refrigerant entering the container 1 causes the float 13 to rise, and the engagement of the walls of the slots 15 with the pins 14 operates to move the needle valve 19 away from the seat 8 to permit liquid refrigerant to flow from the container into the pipe 17 through the valve chamber 18 and into the outlet pipe 20. This liquid refrigerant passes from the pipe 20 through the port 35 into the bellows 23, and when the pressure is sufficient, it expands said bellows against the resistance of spring 34 and moves the needle valve 25 from its seat, thereby allowing the refrigerant to pass through the port 27 into the pipe 28 and on to the expansion coils. This flow of the refrigerant will continue as long as the pressure thereof is sufficient to maintain the needle valve 25 in an open position. As soon as the pressure falls, due to the downward movement of the float 13 operating to move the valve 9 to its seat, the pressure of the spring 34 will then exert itself and close the valve 25. As will be seen, however, the liquid refrigerant in the pipe 20 will still be maintained under pressure, and this pressure is exerted upon the end of the valve 9. As soon as the height of the liquid refrigerant rises in the chamber 1, the float rises and the valve 9 will readily be moved thereby to its seat, owing to the pressure on its outer end of the refrigerant in the outlet pipe 20 and connecting pipe 17. As stated, therefore, the movement of the needle valve 9 is greatly facilitated owing to the fact that the pressures on opposite ends thereof is practically balanced.

A further advantage of my invention resides in the fact that as there is always pressure in the outlet pipe 20 and the connecting pipe 17, no freezing will occur around the valve 9 and its seat, as no expansion of the liquid refrigerant occurs at this point. Hence, there is no tendency for the valve 9 to stick on its seat due to freezing. This is a frequent occurrence in other systems which do not employ my invention, and is very inconvenient as the system must be shut down and the container 1 opened in order to thaw out the float valve. In my improvement, any freezing that occurs will be around the valve head 26, and should this occur, it is a very easy matter to thaw out the valve by applying heat to the plug 22, as my improved control valve is located entirely in the clear and is readily accessible at all times.

I have described above the preferred embodiment of my invention. It is to be understood, however, that the same is not limited to the exact details of construction above described, nor to the exact arrangement or position of the parts shown.

I claim:

1. In a refrigerating system, in combination with a receiver for liquid refrigerant connected with the low side of the system, a float valve for controlling the flow of refrigerant from the receiver, and a valve controlled by differential pressures interposed in the line between said receiver and the low side of the system.

2. In a refrigerating system, in combination with a receiver for liquid refrigerant connected with the low side of the system, a float valve for controlling the flow of refrigerant from the receiver, and a valve interposed in the line between said receiver and the low pressure side of the system and normally held closed by a predetermined pressure exerted on one side and adapted to be opened by a greater pressure by the liquid refrigerant from said receiver exerted on the other side.

3. In a refrigerating system, in combination with a receiver for liquid refrigerant connected with the low side of the system, a float valve for controlling the flow of refrigerant from the receiver, a valve interposed in the line between said receiver and the low pressure side of the system and normally held closed by spring pressure and adapted to be opened by pressure of the liquid refrigerant on said valve opposing and greater than the pressure of said spring.

4. In a refrigerating system, in combination with a receiver for liquid refrigerant having an outlet connecting with the low pressure side, a valve controlling said outlet, a float located in said receiver and controlling the movement of said valve according to the height of liquid refrigerant in the receiver, a valve casing mounted in the line between said receiver and the low pressure side and having an inlet for liquid refrigerant from the receiver and an outlet leading to the low pressure side, a valve for controlling the outlet from said casing and subject to the pressure of the liquid refrigerant passing through said inlet to open the same, and means for normally holding said valve closed at a predetermined pressure.

5. In a refrigerating system, in combination with a receiver for liquid refrigerant connected with the low pressure side of the system, a valve for controlling the flow of refrigerant from the receiver, a float located in said receiver for controlling said valve in accordance with the height of the liquid refrigerant in the receiver, and means located in the line between said receiver and the low pressure side of the system for maintaining a back pressure of liquid refrigerant upon the valve controlled by said float.

6. In a refrigerating system, in combination with a receiver for liquid refrigerant connected to the low side of the system, a valve for controlling the flow of refrigerant from the receiver, a float for controlling the operation of said valve in accordance with the height of liquid refrigerant in said receiver, and differential valve mechanism mounted in the line between the valve of the receiver and the low pressure side and operating to maintain a back pressure of liquid refrigerant upon said float-controlled valve.

7. In a refrigerating system, in combination with a receiver for liquid refrigerant connected with the low side of the system, a float valve for controlling the flow of refrigerant from the receiver, a valve controlled by differential pressure interposed in the line between said receiver and the low side of the system, and means for adjusting said valve to varying pressures.

8. In a refrigerating system, in combination with a receiver for liquid refrigerant connected to the low side of the system, a valve for controlling the flow of refrigerant from the receiver, and automatic means mounted in the line between the valve of the receiver and the low pressure side of the system operating to maintain a back pressure of liquid refrigerant upon said valve.

In testimony whereof, I have hereunto set my hand.

WALTER G. E. ROLAFF.